United States Patent
Bang

(10) Patent No.: US 7,522,182 B2
(45) Date of Patent: Apr. 21, 2009

(54) METHOD AND APPARATUS FOR IMAGE CAPTURE AND TRANSMISSION IN A MOBILE COMMUNICATION DEVICE

(75) Inventor: Joon-Sung Bang, Seoul (KR)

(73) Assignee: LG Electronics Inc., Seoul (KR)

( * ) Notice: Subject to any disclaimer, the term of this patent is extended or adjusted under 35 U.S.C. 154(b) by 644 days.

(21) Appl. No.: 11/066,053

(22) Filed: Feb. 24, 2005

(65) Prior Publication Data

US 2005/0213834 A1    Sep. 29, 2005

(30) Foreign Application Priority Data

Mar. 24, 2004   (KR) ...................... 10-2004-0020128

(51) Int. Cl.
*H04N 7/14* (2006.01)
*G06F 3/00* (2006.01)

(52) U.S. Cl. .............. 348/14.08; 348/14.01; 348/14.02; 455/466

(58) Field of Classification Search ... 348/14.01–14.08, 348/14.09, 14.1, 14.11, 14.12, 14.13, 14.14; 379/90.01, 93.24; 455/414.1, 466, 556.1; 715/716; 709/205, 206
See application file for complete search history.

(56) References Cited

U.S. PATENT DOCUMENTS 7,010,790 B2 * 3/2006 Marsot et al. ............... 718/105
7,046,276 B2 * 5/2006 Hashimoto et al. ........ 348/220.1

FOREIGN PATENT DOCUMENTS

| EP | 1 117 230 A2 | 7/2001 |
| EP | 1 367 832 A2 | 3/2003 |
| EP | 1367832 A2 * | 12/2003 |
| JP | 2004-032236 | 1/2004 |
| JP | 2004-056469 | 2/2004 |

OTHER PUBLICATIONS

Hungter J et al.: "Building and Indexing a Distributed Multimedia Presentation Archive Using SMIL" Lecture Notes in Comuter Science, Springer Verlag, Berlin, DE, vol. 2163, 2001, pp. 415-428, XP002362626 ISSN: 0302-9743.

* cited by examiner

*Primary Examiner*—Melur Ramakrishnaiah
(74) *Attorney, Agent, or Firm*—Lee, Hong, Degerman, Kang & Waimey

(57) ABSTRACT

An apparatus and method for capturing and transmitting a plurality of consecutive still images that look like moving images. An MMS (Multimedia Messaging Service) message is generated using stored consecutive still images and a SMIL (Synchronized Multimedia Integration Language) application with the MMS message transmitted to a recipient.

17 Claims, 3 Drawing Sheets

METHOD AND APPARATUS FOR IMAGE CAPTURE AND TRANSMISSION IN A MOBILE COMMUNICATION DEVICE

CROSS-REFERENCE TO RELATED APPLICATIONS

Pursuant to 35 U.S.C. § 119(a), this application claims the benefit of earlier filing date and right of priority to Korean Application No. 20128/2004, filed on Mar. 24, 2004, the contents of which is hereby incorporated by reference herein in its entirety:

BACKGROUND OF THE INVENTION

1. Field of the Invention

The present invention relates to image capture and transmission by a mobile communication device, and more particularly, to a method and apparatus for capturing and transmitting consecutive still images that appear to be moving images.

2. Description of the Related Art

A user having a mobile communication device, or user equipment, that is subscribed and registered in a communication system may communicate with another communication device in the system via a communication path set by a Mobile Switching Center (MSC) within a service area formed by a base station (BS). However, the user equipment may be used for more than just communication with other user equipment.

Accordingly, mobile communication service providers have developed and offered a variety of supplementary services in order to increase the utilization rate of the user equipment and provide convenience for subscribers. For example, a mobile communication service provider may offer text messaging, multimedia messaging and radio on-line games as well as self-developed additional functions such as a phonebook, note taking, message writing, an organizer, games and a camera. One such supplementary service is a multimedia messaging service that allows a user to display or transmit both still images and moving images that have been captured and stored using a camera function of the user equipment.

FIG. 1 illustrates a conventional mobile communication system 1. With reference to FIG. 1, user equipment 10 moves freely in a service area formed by a base station 20 and in a service area formed by another base station (not shown) and communicates with other user equipment. The types of communications are determined according to signals transmitted by the user equipment; voice communications, text messaging (using symbols, numbers and graphics) and multimedia (including image signals, audio signals and text signals).

Another user communicating with the user equipment 10 is connected to a communications network through a communication path set by a mobile switching center (MSC) 30. If the other user equipment is subscribed to the current communications network, the connection to the communications network is via the self-set communication path. If the other user equipment is subscribed to a different communications network, the connection to the communications network is via a public network 40.

Communication modes formed between two users are classified as a real-time communication mode, which allows the user equipment to communicate in real time, and a non-real-time communication mode, which allows a user to check received data at the user's convenience. Generally, the cost according to communication channel occupation is higher in the real-time communication mode than in the non-real-time communication mode.

In particular, in the real-time communication mode, the longer communications are performed, the longer a channel is occupied and the higher the cost. However, in the non-real-time communication mode, when the amount of data transmitted is large, channel bandwidth is wider, thereby occupying a plurality of channels at the same time and increasing channel occupation time and cost.

FIG. 2 is a flowchart illustrating a conventional method for capturing and transmitting images with user equipment in a mobile communication system. When user's instruction to initiate image capture is inputted through an input device such as a keypad, the user equipment 10 drives a capturing means, such as a camera, to capture one or more images of a subject (S210). If a plurality of still images is captured, the images are sequentially stored in a designated storage region (S220). Thereafter, if the user desires to transmit the stored images (S230), the user equipment selects specific still images selected by the user (S240), designates an ID of the recipient and transmits the selected still images (S250). Accordingly, when a plurality of still images are transmitted, the processes (S240 to S260) will be performed repeatedly.

In the conventional art, the user equipment 10 limits files related to multimedia images, which are attached when transmitting an MMS (Multimedia Messaging Service) message, to a still image and a moving image. Accordingly, transmission of information related to a moving subject is limited. It takes a long time with associated high communication cost to transmit and receive a moving image due to the large size. On the other hand, when a plurality of still images is transmitted, the still images are transmitted individually; a process that is not only inconvenient but also takes a long time.

Therefore, there is a need for a mobile communication device that transmits a plurality of still images that relate the motion of a captured subject in a manner that is convenient and cost-effective. The present invention addresses these and other needs.

SUMMARY OF THE INVENTION

The present invention is directed to a to a method and apparatus for capturing and transmitting consecutive still images that appear to be moving images.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile communication device that allows the user to capture a plurality of still images of a subject and transmit those images in a cost-effective and efficient manner such that the transmitted still images appear to be a moving image. Specifically, the user indicates whether to capture a single image or a plurality of consecutive still images and, if a plurality of images is selected, the mobile communication device captures a plurality of consecutive still images and generates a MMS message that is then transmitted to a recipient. Although the invention is described herein with regard to a mobile communication device, it is contemplated that the invention may be utilized whenever it is desired to capture a plurality of consecutive still images and transmit the images such that they appear to be a moving image.

In one aspect of the invention, a mobile communication device is provided for capturing and transmitting images. The mobile communication device includes a control unit that controls the operation of the device, a capture unit that can capture either a single still image or a plurality of consecutive still images, an MMS generating unit that generates an MMS message from a plurality of consecutive still images and a radio unit that transmits the MMS message to a recipient.

It is contemplated that the mobile communication device may also include a program unit that provides an SMIL (Synchronized Multimedia Integration Language) application to the MMS generating unit. The MMS generating unit may process the plurality of consecutive still images in slide form using the SMIL application.

It is contemplated that the mobile communication device may include an input/output device that displays the generated MMS message such that the message may be viewed before it is transmitted to a recipient. It is further contemplated that the capture unit may capture the plurality of consecutive still images and the input/output unit may display the MMS message according to units of time specified by a user. Moreover, it is contemplated that the capture unit captures either a single still image or a plurality of consecutive still images according to a user's selected mode.

In another aspect of the invention, a method is provided for capturing and transmitting images in a mobile communication device. The method includes capturing either a single still image or a plurality of consecutive still images, generating an MMS message if a plurality of still images is captured and transmitting the MMS message to a recipient.

It is contemplated that the MMS message may be generated using an SMIL application. It is further contemplated that the MMS message may be generated in slide form.

It is contemplated that the method may include processing a user input to select whether a single still image or a plurality of consecutive still images is captured. It is further contemplated the method may include processing a user input to determine the units of time used to capture a plurality of consecutive still images.

It is contemplated that the method may include displaying the MMS message on a display unit. It is further contemplated the method may include processing a user input to determine the units of time used to display the MMS message. Moreover, it is contemplated that the method may be performed in a control unit.

In another aspect of the invention, a mobile terminal is provided for capturing and transmitting images. The mobile terminal includes a control unit that controls the operation of the mobile terminal, a capture unit that can capture either a single still image or a plurality of consecutive still images, an MMS generating unit that generates an MMS message from a plurality of consecutive still images using a SMIL application, a program unit that provides the SMIL application to the MMS generating unit, an input/output unit that displays the MMS message, and a radio unit that transmits the MMS message to a recipient.

It is contemplated that the MMS generating unit may process the plurality of consecutive still images in slide form. It is further contemplated that a user may indicate the units of time used to capture the plurality of still images and display the MMS message. Moreover, it is contemplated that the user may set a capture mode used to determine whether a single still image or a plurality of consecutive still images is captured.

The foregoing and other objects, features, aspects and advantages of the present invention will become more apparent from the following detailed description of the present invention when taken in conjunction with the accompanying drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to an apparatus and method for capturing and transmitting consecutive still images that appear to be moving images. Although the present invention is illustrated with respect to a mobile communication device, it is contemplated that the present invention may be utilized anytime it is desired to capture and transmit still images of a moving subject such that the still images appear to be moving images.

Reference will now be made in detail to the preferred embodiments of the present invention, examples of which are illustrated in the accompanying drawings. The present invention is directed to a mobile communication device using SMIL (synchronized multimedia integration language) to capture and transmit still images of a moving subject such that a plurality of consecutive images look like moving images.

SMIL, recommended by the World Wide Web Consortium (W3C), is designed to be the standard markup language for standardized multimedia and is based on XML (Extensible Markup Language) composed of simple few tags and attributes. SMIL enables the creation of multimedia contents more easily and effectively by integrating the techniques necessary for providing multimedia services and may include a variety of media such as streaming audio or video, images, and text. The W3C presents SMIL, which may provide a presentation function as well as multimedia contents, streaming audio and video, images and texts, as a standard language for transmitting multimedia.

A message generated using SMIL is called an MMS message. In order to transmit and receive an MMS message between a user and a recipient having user equipment produced by different manufacturers, the content of the message, allowed elements and attributes of the presentation language, media content format and lower level capabilities are required.

Figure 1:
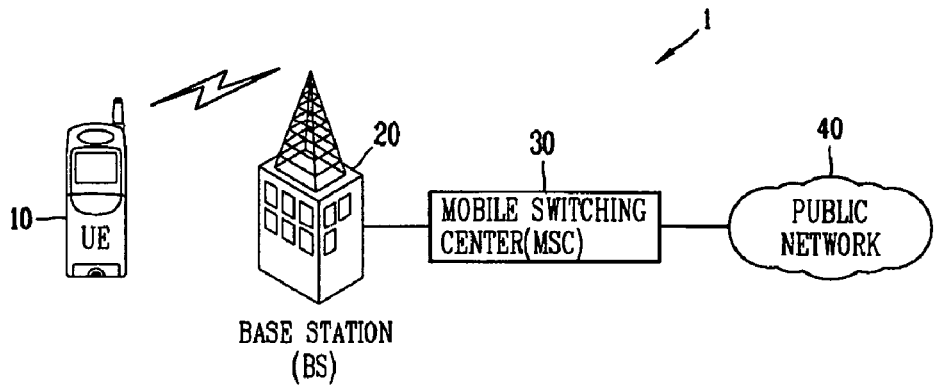
FIG. 1 illustrates a conventional mobile communication system.
Figure 2:
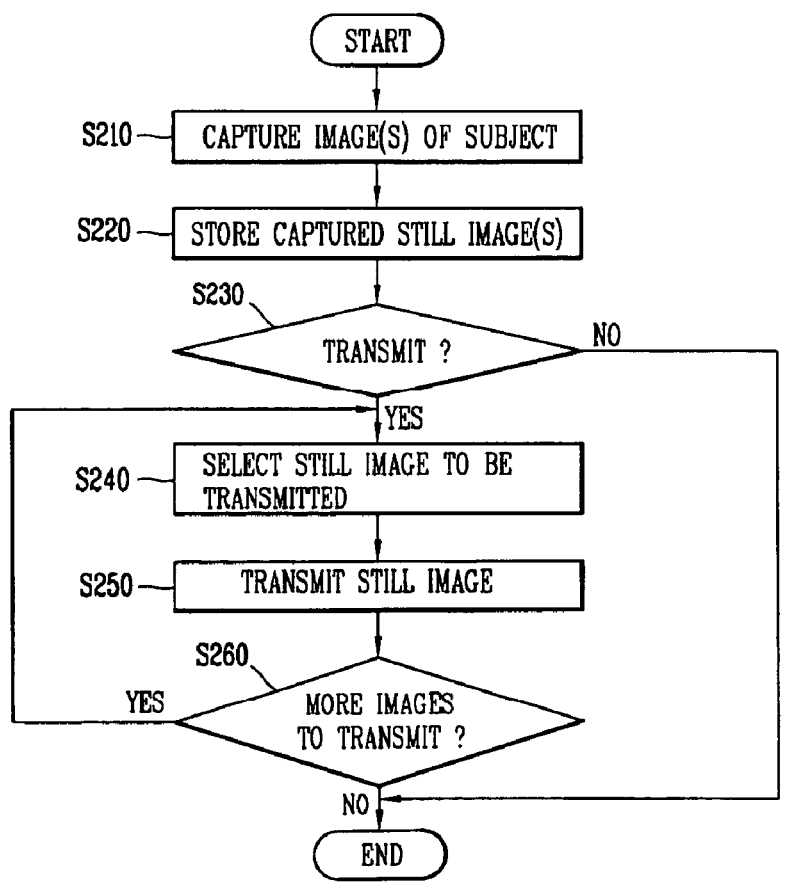
FIG. 2 illustrates a flowchart of a conventional method for capturing and transmitting an image with user equipment in a mobile communication system.
Figure 3:
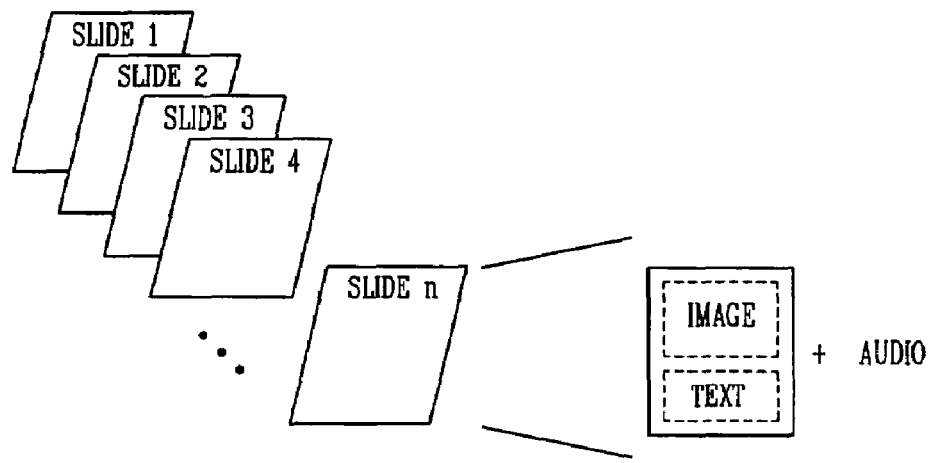
FIG. 3 illustrates slide constructions in accordance with the conventional art.

FIG. 3 illustrates a conventional MMS (Multimedia Messaging Service) message construction. Each of slides shown in FIG. 3 can include text and sound. Utilizing the present invention, each multimedia message will be represented by SMIL. All still images to be represented by SMIL have the same layout.

According to the W3C SMIL specifications, elements of MMS SMIL are composed of five modules. There are five basic modules for generating an MMS message.

The first layout module provides a framework for spatial layout of visual components as illustrated in Table 1. Default dimensions of the root-layout are the dimensions of the mobile communication device, or user equipment, display area and are expressed in pixels.

The second media object module provides a framework for describing the media that constitute a SMIL presentation as illustrated in Table 2. The MMS SMIL includes the parts of the SMIL BasicMedia module.

The third structure module describes the structure of the SMIL document. MMS SMIL adopts the SMIL Structure module as illustrated in Table 3.

The fourth timing and synchronization module provides a framework for timing structure, timing control properties and temporal relationships between the elements as illustrated in Table 4.

TABLE 1

Layout Modules

| Elements | Attributes | Content Model |
| --- | --- | --- |
| Layout | | region, root-layout |
| Region | left, top, height, width, fit, id | EMPTY |
| root-layout | width, height | EMPTY |

TABLE 2

Media Object Modules

| Elements | Attributes | Content Model |
| --- | --- | --- |
| Text | src, region, alt, begin, end | EMPTY |
| Img | src, region, alt, begin, end | EMPTY |
| Audio | src, alt, begin, end | EMPTY |
| ref, | src, region, alt, begin, end | EMPTY |

TABLE 3

Structure Modules

| Elements | Attributes | Content Model |
| --- | --- | --- |
| Smil | | head, body |
| Head | | layout |
| Body | | MMSSchedule |

TABLE 4

Timing and Synchronization Modules

| Elements | Attributes | Content Model |
| --- | --- | --- |
| Par | dur | MMSMediaContent |

TABLE 5

Meta Information Modules

| Elements | Attributes | Content Model |
| --- | --- | --- |
| Meta | Name, content | EMPTY |

The fifth Meta information module contains elements and attributes describing SMIL documents as illustrated in Table 5. The MMS messages may contain meta-information included in the message by means of the Meta element.

Figure 4:
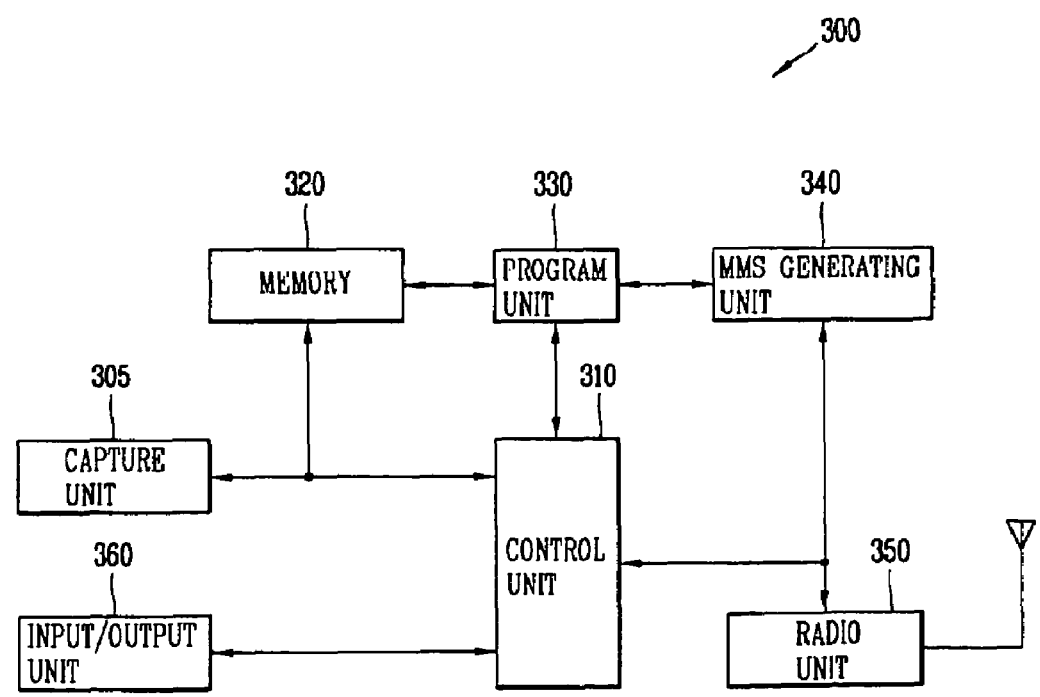
FIG. 4 illustrates a block diagram of a mobile communication device in accordance with the present invention.

FIG. 4 illustrates a block diagram of user equipment for image capture and transmission in accordance with the present invention. As shown in FIG. 4, the user equipment 300 includes a capture unit 305, a control unit 310, memory 320, a program unit 330, an MMS generating unit 340, a radio unit 350 and an input/output unit 360.

The control unit 310 controls the capture unit 305 to capture images of a subject, stores the captured still images in memory 320 and outputs or transmits the stored still images. The capture unit 305 captures still images of a target subject under the control of the control unit 310.

The program unit 330 contains a plurality of application programs, including SMIL Application programs. The program unit 330 performs the programs under control of the control unit 310.

The MMS generating unit 340 converts captured still images designated by the control unit 310 to generate an MMS message. The control unit 310 controls time intervals used for the capture and display of consecutive still images constituting the MMS message according to user selection via the input/output unit 360.

The input/output unit 360 is connected to the control unit 310 and receives/transmits an audio signal, a text signal using audio signals, texts, symbols, numbers and graphics as well as a dialing signal according to a recipient's ID through a microphone, a speaker, a keyboard and a display unit. An image signal for multimedia communications that is captured by the capture unit 305 may be displayed via a display unit that is part of the input/output unit 360, thereby allowing an image being transmitted by the user equipment 300 to be viewed.

The radio unit 350 provides transmission and reception between the user equipment 300 and other users in the communications system 1. Once the radio unit 350 is connected to a base station 20, the radio unit transmits the MMS message to the base station.

Figure 5:
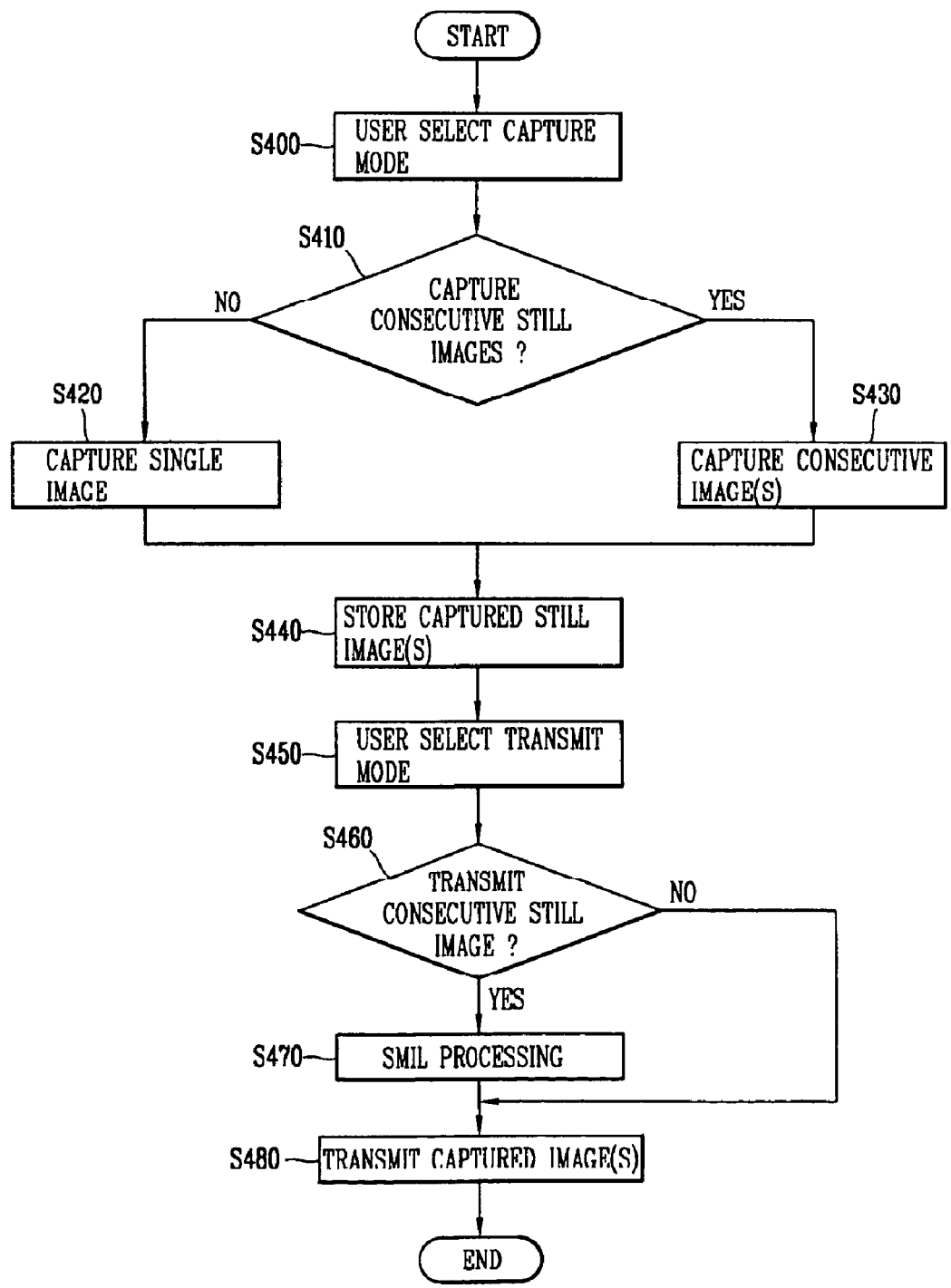
FIG. 5 illustrates a flowchart of a method for capturing and transmitting images with a mobile communication device in accordance with the present invention.

FIG. 5 illustrates a flowchart of a method for capturing and transmitting images with the user equipment 300 in accordance with the present invention. A user indicates whether to capture a single still image or a plurality of consecutive still images of a subject by inputting commands via the input/output unit 360 (S400). The capture mode set by the user is then checked (S410) and the capture unit 305 then captures one or more images of a subject according to the set capture mode (S420 and S430). The captured still images are stored in an allocated region of memory 320 (S440).

If the capture mode is set to single-image capture mode according to the user, the capture unit 305 captures a single still image (S420). Thereafter, the generated still image is stored (S440) and transmitted (S480) according to conventional methods under control of the control unit 310.

On the other hand, if the capture mode is set to consecutive-images capture mode according to the user, the capture unit 305 captures a plurality of consecutive still images (S430).

The capture unit 305 captures images of the subject after setting capture-time intervals to capture consecutive still images by set units of time, thereby generating a plurality of consecutive still images. The user may indicate the capture-time intervals. The captured consecutive still images are stored in memory 320 under control of the control unit 310 (S440).

When transmitting the stored still images to a recipient, the user selects a transmit mode (S450). The transmit mode is then checked (S460) to determine whether a single stored image or a plurality of stored images is to be transferred.

If the user selects to transmit a plurality of consecutive still images, the selected consecutive still images stored in memory 320 are loaded into the MMS generating unit 340. MMS information is generated using the consecutive still images and a SMIL application (S470) and an MMS message is generated according to set units of time using the generated information. The user may indicate the set units of time. The MMS message generated using the consecutive still images is one still image that appears as a moving image.

In order to transmit the generated MMS message or a single still image, the user designates an ID of the recipient's user equipment. The single still image or MMS message is transmitted to the recipient via the base station by the radio unit 350 under control of the control unit 310 (S480).

As described herein, by utilizing the apparatus and method of the present invention, a mobile communication device generates an MMS message according to set units of time using consecutive still images and a SMIL application and transmits the generated MMS message to a recipient. The MMS message has a size that is smaller than a comparable moving image file. The recipient's user equipment, provided with a device for displaying the MMS message, receives the MMS message at a lower cost in comparison to the transmission of moving images, the MMS message having a similar appearance to the moving images. In addition, the communications cost of the sender is reduced because channel occupancy is lowered.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile communication device for capturing and transmitting images, the mobile communication device comprising:
   a control unit adapted to control the operation of the mobile communication device;
   a capture unit adapted to capture either a single still image or a plurality of consecutive still images, wherein the capture unit is further adapted to capture the plurality of consecutive still images according to units of time set by a user;
   a multimedia processing unit adapted to generate a moving image by processing the plurality of consecutive still images captured by the capture unit and to generate a multimedia message under control of the control unit wherein the multimedia message comprises the moving image; and
   a radio unit adapted to transmit the multimedia message.

2. The mobile communication device of claim 1, further comprising a program unit adapted to provide an SMIL application to the multimedia processing unit.

3. The mobile communication device of claim 1, wherein the multimedia processing unit is further adapted to process the plurality of consecutive still images as the moving image using an SMIL application.

4. The mobile communication device of claim 1, further comprising an input/output unit adapted to display the multimedia message.

5. The mobile communication device of claim 4, wherein the input/output unit is further adapted to display the multimedia message according to units of time set by a user.

6. The mobile communication device of claim 1, wherein the capture unit is further adapted to capture the single still image or the plurality of consecutive still images according to a capture mode set of by a user.

7. A method for capturing and transmitting images in a mobile communication device, the method comprising:
   capturing either a single still image or a plurality of consecutive still images of a subject, wherein capturing the single still image or the plurality of consecutive still images comprises processing an input from a user to determine units of time for capturing the single still image or the plurality of consecutive still images;
   generating a multimedia message comprising a moving image by processing the plurality of captured consecutive still images; and
   transmitting the multimedia message.

8. The method of claim 7, wherein the multimedia message is generated using an SMIL application.

9. The method of claim 7, wherein the multimedia message is generated in a slide form.

10. The method of claim 7, further comprising processing an input from a user to determine whether to capture the single still image or the plurality of consecutive still images.

11. The method of claim 7, further comprising displaying the multimedia message on a display unit.

12. The method of claim 11, wherein displaying the multimedia message further comprises processing an input from a user to determine units of time for displaying the multimedia message.

13. The method of claim 7, wherein the capturing, generating and transmitting steps are performed under the control of a control unit.

14. A mobile terminal for capturing and transmitting images, the mobile communication terminal comprising:
   a control unit adapted to control the operation of the mobile terminal;
   a capture unit adapted to capture either a single still image or a plurality of consecutive still images, wherein the capture unit is adapted to capture the plurality of still images according to units of time set by a user;
   a multimedia processing unit adapted to generate a moving image by processing the plurality of consecutive still images using a SMIL application and to generate a multimedia message under control of the control unit wherein the multimedia message comprises the moving image;
   a program unit adapted to provide the SMIL application to the multimedia processing unit;
   an input/output unit adapted to display the multimedia message;
   a radio unit adapted to transmit the multimedia message.

15. The mobile terminal of claim 14, wherein the multimedia processing unit is further adapted to process the plurality of consecutive still images in slide form.

16. The mobile terminal of claim 14, wherein the capture unit is further adapted to capture the plurality of consecutive still images according to units of time set by a user.

17. The mobile terminal of claim 14, wherein the capture unit is further adapted to capture the single still image or the plurality of consecutive still images according to a capture mode set by a user.

* * * * *